US007003778B2

(12) United States Patent
Sokolov

(10) Patent No.: US 7,003,778 B2
(45) Date of Patent: Feb. 21, 2006

(54) EXCEPTION HANDLING IN JAVA COMPUTING ENVIRONMENTS

(75) Inventor: Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 673 days.

(21) Appl. No.: 09/999,841

(22) Filed: Oct. 24, 2001

(65) Prior Publication Data

US 2003/0079202 A1 Apr. 24, 2003

(51) Int. Cl.
G06F 11/00 (2006.01)
(52) U.S. Cl. .................. 719/318; 718/1; 714/100; 714/48
(58) Field of Classification Search ............. 719/312, 719/318; 718/1; 714/100, 48
See application file for complete search history.

(56) References Cited

U.S. PATENT DOCUMENTS

| 5,455,949 | A | * | 10/1995 | Conder et al. ............. 712/234 |
| 5,628,016 | A | * | 5/1997 | Kukol ...................... 717/140 |
| 5,761,407 | A | * | 6/1998 | Benson et al. ............. 714/37 |
| 5,761,513 | A | * | 6/1998 | Yellin et al. .............. 717/127 |
| 6,003,038 | A | * | 12/1999 | Chen ...................... 707/103 R |
| 6,009,517 | A | * | 12/1999 | Bak et al. ................. 712/245 |
| 6,131,187 | A | * | 10/2000 | Chow et al. ............... 717/106 |
| 6,247,169 | B1 | * | 6/2001 | DeLong .................... 717/131 |
| 6,293,712 | B1 | * | 9/2001 | Coutant .................... 717/155 |
| 6,848,111 | B1 | * | 1/2005 | Schwabe et al. ........... 719/331 |

OTHER PUBLICATIONS

Venners, Bill. "Exceptions in Java". Java World, Jul. 1998.*
Waddington, Simon et al. "Java: Virtual Machine for Virtually Any Platform." Embedded Systems Programming. Jun. 1996.*
Cramer, Timothy et al. "Compiling Java Just in Time." IEEE. 1997.*
Jaworski, Jamie. "Java Developer's Guide." Chapter 37, The Java Virtual Machine. Sams Publishing. 1996.*
Golm, Michael et al. "A Retargetable JIT Compiler for Java." Technical Report. Jan. 1999.*

(Continued)

Primary Examiner—Lewis A. Bullock, Jr.
(74) Attorney, Agent, or Firm—Beyer Weaver & Thomas, LLP

(57) ABSTRACT

Techniques for handling exceptions raised during the execution of Java computer programs are disclosed. The techniques can be used by a Java virtual machine to efficiently handle exceptions. A method descriptor is implemented in a Java method frame which is stored in the Java execution stack. The method descriptor provides one or more references to exception handlers associated with the Java method. The references can be used to quickly identify and invoke the appropriate exception handler. This can be achieved without having to use a native language execution stack. As a result, the overhead associated with several returns from native functions (routines or methods) can be avoided since the information needed to invoke the appropriate exception handler can be obtained efficiently from the Java execution stack. Accordingly, the performance of Java virtual machines, especially those operating with limited resources, can be significantly enhanced.

14 Claims, 4 Drawing Sheets

OTHER PUBLICATIONS

Aoki, Takashi et al. "On the Software Virtual Machine for the Real Hardware Stack Machine." Proceedings of the Java Virtual Machine Research and Technology Symposium, Apr. 23-24, 2001.*

Lee, Seungll et al. "Efficient Java Exception Handling in Just-in-Time Compilation." ACM. 2000.*

Lindholm et al., "The Java™ Virtual Machine Specification," (Sep. 1996), Sun Microsystems, Inc., Chapters 1-10 (173 pp.).

Horstmann et al. "Core Java™ vol. II-Advanced Features," Chapter 11, Native Methods, © 2000 Sun Microsystems, Inc. pp. 843-899.

* cited by examiner

EXCEPTION HANDLING IN JAVA COMPUTING ENVIRONMENTS

BACKGROUND OF THE INVENTION

The present invention relates generally to Java programming environments, and more particularly, to frameworks for generation of Java macro instructions in Java computing environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a Java virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed, without modification, on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler 103 outputs a Java class file 105 that includes the Bytecodes for the Java program. The Java class file 105 is input into a Java virtual machine 107. The Java virtual machine 107 is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1 B, the class file 100 includes a constant pool 102 portion, interfaces portion 104, fields portion 106, methods portion 108, and attributes portion 110. The methods portion 108 can include, or have references to, several Java methods associated with the Java class which is represented in the class file 100.

Sometimes during the execution of a Java method, an exception is raised (e.g., divide by zero). This situation typically requires invocation of an exception handler. One problem with the conventional approaches to exception handling in Java computing environments is that there is a significant overhead associated with invoking the appropriate exception handler when an exception is raised. This is partly attributed to the fact that the exception handler can be associated with a Java method that is several levels deep (i.e., exception has occurred during execution of a Java method which has been invoked by a Java method that has been invoked by another Java method, and so on).

Moreover, conventional approaches can require several returns to be made from native functions (procedures or subroutines) written in a non-Java programming language (e.g., C or C++) in order to identify the appropriate exception handler. This can significantly hinder the performance of Java virtual machines, especially those operating with limited memory and/or limited computing power (e.g., embedded systems).

In view of the foregoing, there is a need for improved frameworks for exception handling in Java computing environments.

SUMMARY OF THE INVENTION

Broadly speaking, the invention relates to improved techniques for handling exceptions raised during the execution of Java computer programs. As such, the techniques can be used by a Java virtual machine to efficiently handle exceptions. In one embodiment, a method descriptor is implemented in a Java method frame which is stored in the Java execution stack. The method descriptor provides one or more references to exception handlers associated with the Java method. As will be appreciated, the references can be used to quickly identify and invoke the appropriate exception handler. This can be achieved without having to use a native language execution stack. As a result, the overhead associated with several returns from native functions (routines or methods) can be avoided since the information needed to invoke the appropriate exception handler can be obtained efficiently from the Java execution stack. Accordingly, the performance of Java virtual machines, especially those operating with limited resources, can be significantly enhanced.

The invention can be implemented in numerous ways, including as a method, an apparatus, and a computer readable medium. Several embodiments of the invention are discussed below.

One embodiment of the invention discloses a Java computing environment comprising a Java virtual machine, a Java execution stack, and at least one Java method frame stored on the Java execution stack. The Java method frame includes a method descriptor. The method descriptor provides one or more references to information associated with at least one Java method. At least one reference is a reference to an exception handler associated with the at least one Java method.

As a method for handling exceptions which can be raised during execution of a Java program, one embodiment of the invention includes the acts of: determining that an exception has occurred during the execution of the Java program, and identifying a frame for a Java method. The frame is stored on a Java execution stack when it is determined that an exception has occurred. The Java method is associated with an exception handler suitable for handling said exception. This embodiment can also include the act of accessing a field within the frame, the frame providing a reference to the exception handler which is suitable for handling the exception. This embodiment can also invoke the execution handler to handle the exception by using the reference.

Another embodiment of the invention includes a computer readable media including computer program code for handling exceptions during execution of a Java program. The computer readable media includes computer program code for determining that an exception has occurred during the execution of the Java program. The computer program code then can identify a frame for a Java method which is being stored on a Java execution stack when it is determined that an exception has occurred, the Java method being associated with an exception handler suitable for handling the exception. In addition, the computer readable media can include computer program code for accessing a field within the frame. The frame provides a reference to the exception handler which is suitable for handling the exception. Finally, the computer readable media can include computer program code for invoking the execution handler which can handle the exception by using the reference.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, improved techniques for handling exceptions raised during the execution of Java computer programs are disclosed. The techniques can be used by a Java virtual machine to efficiently handle exceptions. In one embodiment, a method descriptor is implemented in a Java method frame which is stored in the Java execution stack. The method descriptor provides one or more references to exception handlers associated with the Java method. As will be appreciated, the references can be used to quickly identify and invoke the appropriate exception handler. This can be achieved without having to use a native language execution stack. As a result, the overhead associated with several returns from native functions (routines or methods) can be avoided since the information needed to invoke the appropriate exception handler can be obtained efficiently from the Java execution stack. Accordingly, the performance of Java virtual machines, especially those operating with limited resources, can be significantly enhanced.

Embodiments of the invention are discussed below with reference to FIGS. 2–3. However, those skilled in the art will readily appreciate that the detailed description given herein with respect to these figures is for explanatory purposes only as the invention extends beyond these limited embodiments.

Figure 1A:
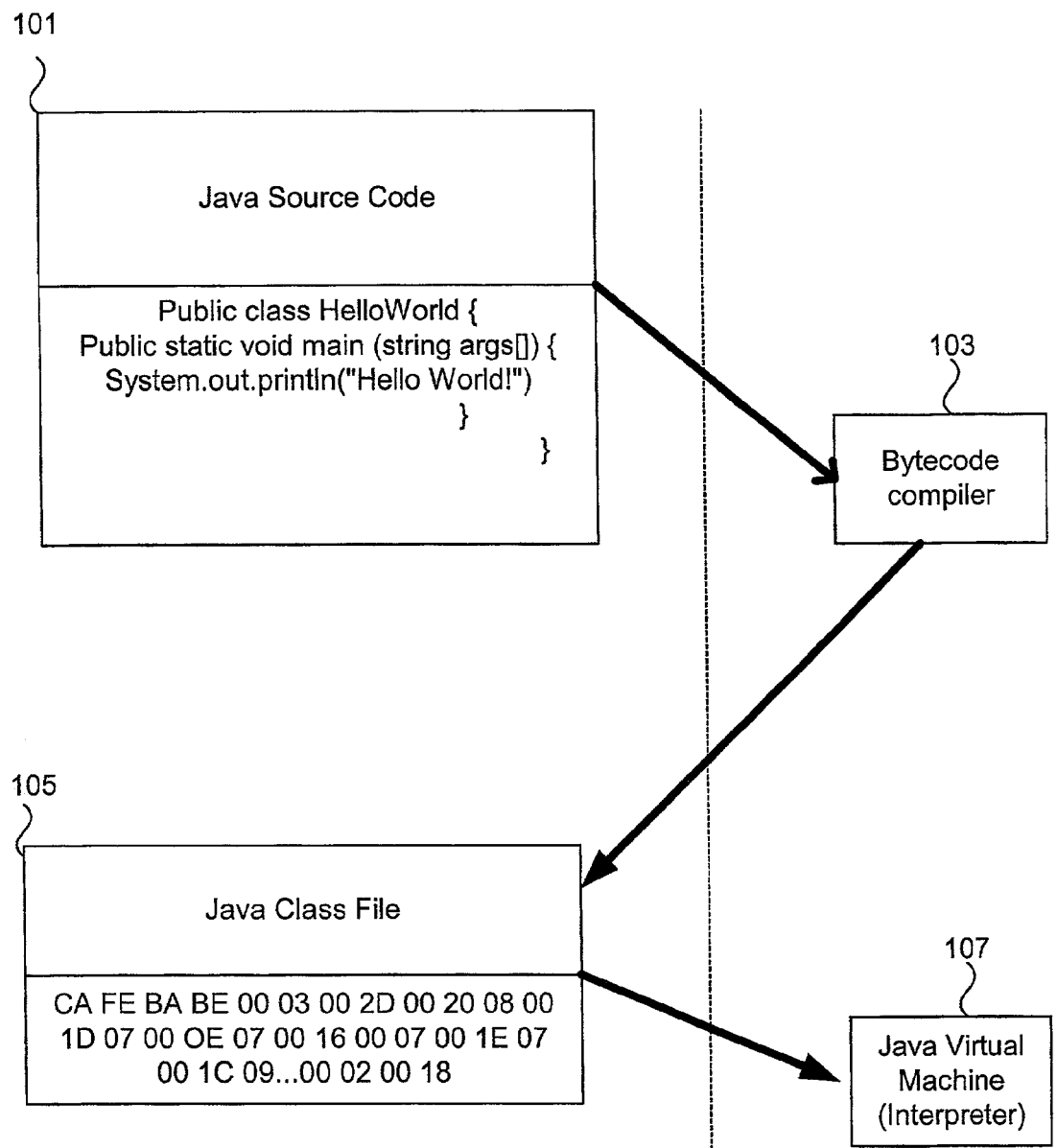
FIG. 1A shows a progression of a simple piece of a Java source code through execution by an interpreter, the Java virtual machine.
Figure 1B:
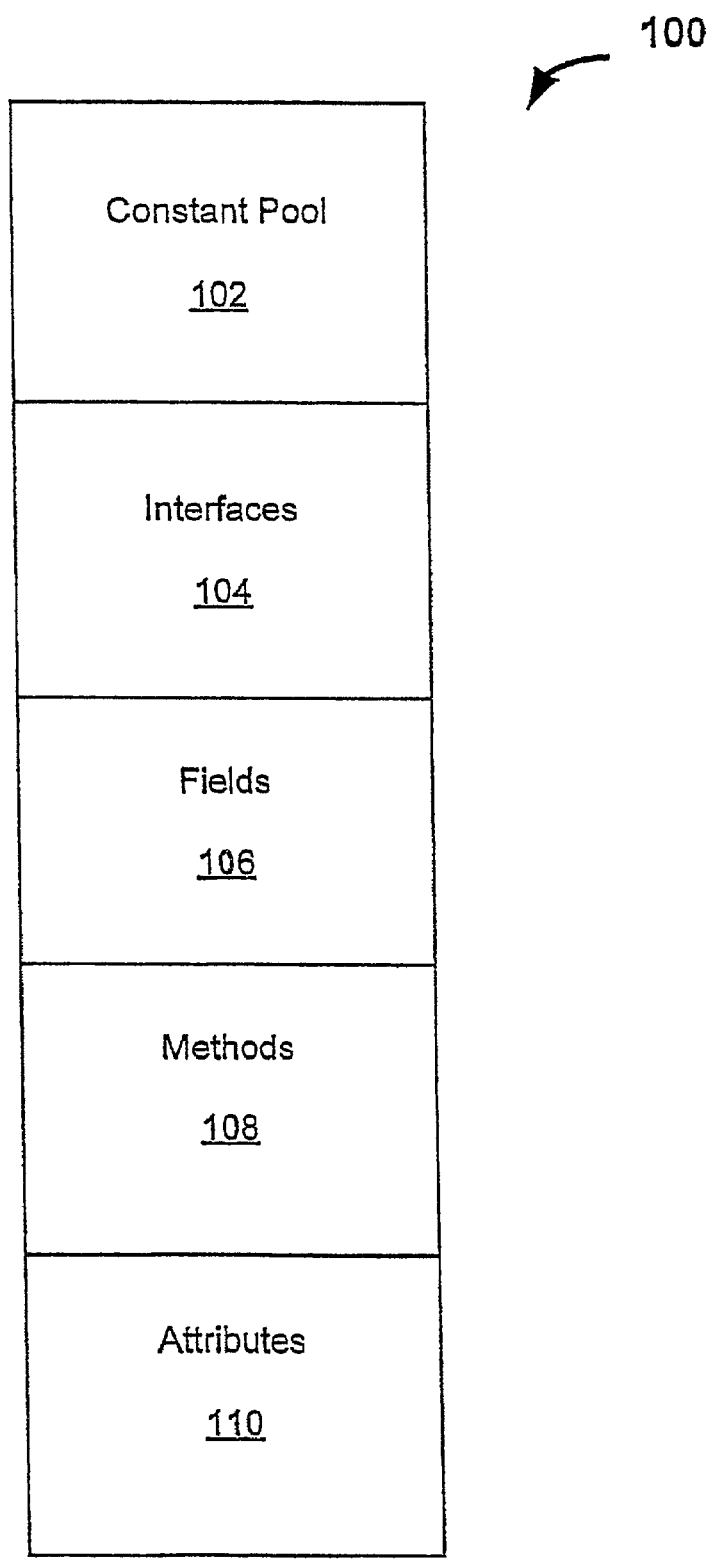
FIG. 1B illustrates a simplified class file.
Figure 2:
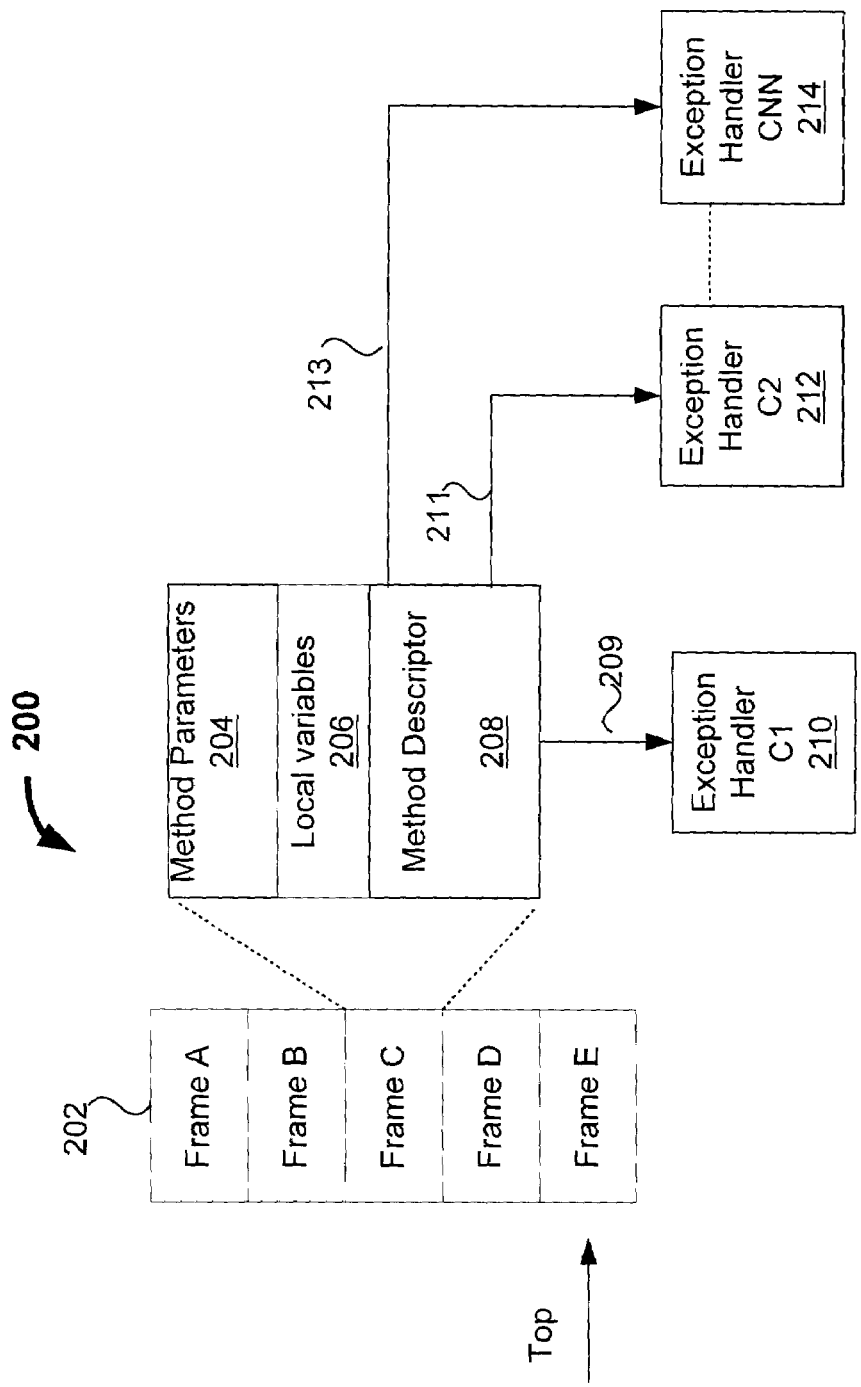
FIG. 2 illustrates a Java computing environment in accordance with one embodiment of the invention.

FIG. 2 illustrates a Java computing environment 200 in accordance with one embodiment of the invention. The Java computing environment 200 includes a Java execution stack 202 suitable for storing frames for Java methods (Java stack frames A–E). Each of the Java stack frames are pushed on the Java execution stack 202 when the associated Java method is invoked. The Java stack frames A–E provide information required to execute the Java methods A–E. For example, the frame C comprises method parameters 204, local variables 206, and method descriptor 208. As will be known to those skilled in the art, the method parameters 204 and local variables 206 can be implemented in a manner similar to conventional implementations. However, unlike conventional implementations, Java method frame C provides the method descriptor 208 which can provide one or more references to the exception handler associated with the Java method C. As shown in FIG. 2, references 209, 211 and 213 respectively reference exception handler C1 210, exception handler C2 212 and exception handler CN 214.

As will be appreciated, when an exception is encountered that requires invocation of an exception handler, the references 209, 211 and 213 provide quick access to the appropriate exception handler. It should be noted that the appropriate exception handler can be identified and invoked efficiently since the information has been made readily available on the Java execution stack. Accordingly, there is no need to search the native language execution stack. As is known to those skilled in the art, the native language execution stack is the execution stack used to execute programming code which is written in a programming language other than the Java programming language (e.g., C, C++).

As a result, the overhead associated with several returns from native functions (routines or methods) can be avoided since the information needed to invoke the appropriate exception handler can be obtained efficiently from the Java execution stack. As a result, the performance of Java virtual machines, especially those operating with limited resources, can be significantly enhanced.

Figure 3:
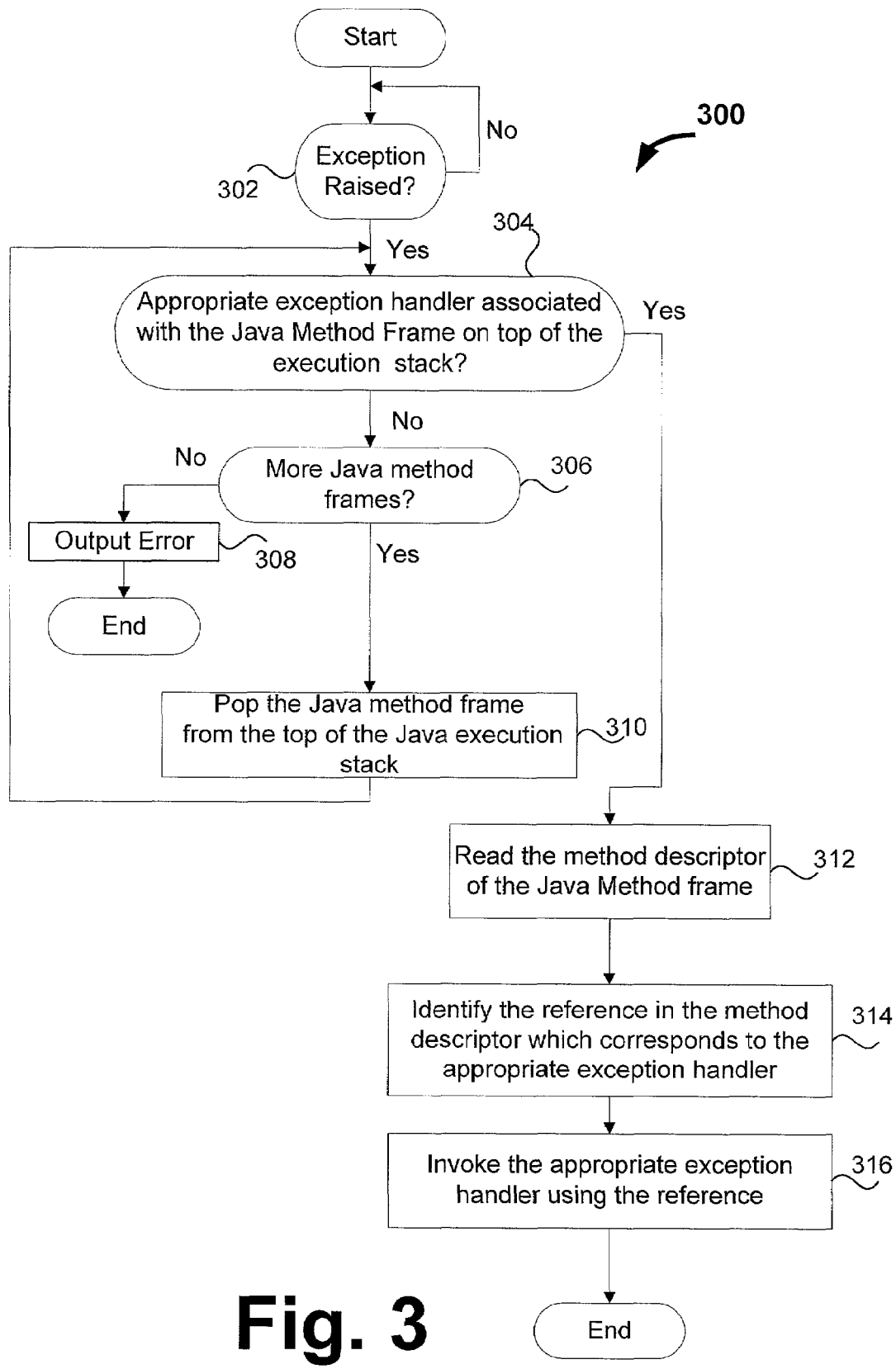
FIG. 3 illustrates a method for handling exceptions during the execution of a Java computer program in accordance with one embodiment of the invention.

FIG. 3 illustrates a method 300 for handling exceptions during the execution of a Java computer program in accordance with one embodiment of the invention. As such, the method can be executed by a Java virtual machine to handle exceptions raised during the execution of the Java computer program. Initially, at operation 302 a determination is made as to whether an exception has been raised. If it is determined that an exception has not been raised, operation 302 can be repeated after a predetermined amount of time. However, if it is determined that an exception has been raised, the method 300 proceeds to operation 304 where a determination is made as to whether the appropriate exception handler is associated with the Java method frame which is currently on top of the Java execution stack. If it is determined at operation 304 that the appropriate exception handler is not associated with the Java method frame which is currently on top of the Java execution stack, the method 300 proceeds to operation 306 where it is determined whether there are more Java method frames on the Java execution stack. If it is determined that there are no more Java method frames on the Java execution stack, an error is output at operation 308. The method 300 ends following operation 308. However, if it is determined at operation 306 that there is at least one more Java method frame on the Java execution stack, the method 300 proceeds to operation 310 where the Java method frame currently on top of the Java execution stack is popped from the Java execution stack. Thereafter, the method 300 proceeds to operation 304 where a determination is made as to whether the appropriate exception handler is associated with the Java method frame which is currently on top of the Java execution stack.

If it is determined at operation 304 that the appropriate exception handler is associated with the Java method frame which is currently on top of the Java execution stack, the method 300 proceeds to operation 312 where the method descriptor of the Java method frame currently on top of the stack is read. Next, at operation 314 the reference in the method descriptor which corresponds to the appropriate exception handler is identified. Accordingly, at operation 316, the appropriate exception handler is invoked using the reference found in the method descriptor. The method 300 ends following operation 316.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A Java computing environment, said Java computing environment comprising:

at least one processor;

a Java virtual machine running on said at least one processor, wherein said virtual machine can execute code which includes Java and native computer program code wherein said native computer program code is associated with a native programming language;

a Java execution stack which does not include any native method frames associated with said native programming language, wherein said native programming language is a programming language other than the Java programming language;

a native execution stack which can be used to execute said native computer program code;

a plurality of Java method frames stored on said Java execution stack, wherein each of said plurality of Java method frames includes a method descriptor, said method descriptor providing one or more references to information associated with a Java method, and wherein at least one reference of said one or more references of said method descriptor is a direct reference to an exception handler which can handle an exception raised by said native programming code or Java programming code, thereby allowing said exception handler to be identified, by said virtual machine to handle said exception, by directly accessing said direct reference without searching said native execution stack or examining said Java method frames stored on said Java execution stack in order to locate said exception handler.

2. A Java computing environment as recited in claim 1, wherein said virtual machine operates to push said Java method frames on said Java execution stack.

3. A Java computing environment as recited in claim 1, wherein said virtual machine operates to identify said method descriptor when an exception is raised.

4. A Java computing environment as recited in claim 3, wherein said virtual machine operates to use said at least one reference to access said exception handler.

5. A Java computing environment as recited in claim 4, wherein said virtual machine operates to invoke said exception handler.

6. A Java computing environment as recited in claim 1, wherein said virtual machine is operating in an embedded system.

7. A method for handling exceptions by a virtual machine that executes Java and native computer program code, said method comprising:

storing a plurality of Java method frames on a Java execution stack used by said virtual machine to execute Java code, wherein each of said plurality of Java method frames includes a method descriptor, said method descriptor providing one or more references to information associated with a Java method, and wherein at least one reference of said one or more references of said method descriptor is a direct reference to an exception handler which can handle an exception raised by said native computer program code or Java program code, thereby allowing said exception handler to be identified, by said virtual machine to handle said exception, by directly accessing said direct reference without searching a native execution stack used to execute said native computer program code written in a native programming language or examining said plurality of Java method frames stored on said Java execution stack in order to identify said exception handler;

determining whether an exception has been thrown ;and invoking said exception handler by accessing said direct reference to said exception handler.

8. A method as recited in claim 7, wherein said native programming language is the C or C++programming language.

9. A method as recited in claim 7, wherein said virtual machine is implemented on an embedded device.

10. A method as recited in claim 7, wherein said virtual machine is implemented on a mobile device.

11. A computer readable medium including at least computer program code for handling exceptions by a virtual machine that executes Java and native computer program code, comprising:

computer program code for storing a plurality of Java method frames on a Java execution stack used by said virtual machine to execute Java code, wherein each of said plurality of Java method frames includes a method descriptor, said method descriptor providing one or more references to information associated with a Java method, and wherein at least one reference of said one or more references of said method descriptor is a direct reference to an exception handler which can handle an exception raised by said native computer program code or Java computer program code, thereby allowing said exception handler to be identified, by said virtual machine to handle said exception, by directly accessing said direct reference without searching a native execution stack used to execute native computer program code written in a native programming language or examining said plurality of Java method frames stored on said Java execution stack in order to identify said exception handler;

computer program code for determining whether an exception has been thrown; and computer program code for invoking said exception handler by accessing said direct reference to said exception handler.

12. A computer readable medium as recited in claim 11, wherein said native programming language is the C or C++programming language.

13. A computer readable medium as recited in claim 11. wherein said virtual machine is implemented on an embedded device.

14. A computer readable medium as recited in claim 11, wherein said virtual machine is implemented on a mobile device.

* * * * *

UNITED STATES PATENT AND TRADEMARK OFFICE
CERTIFICATE OF CORRECTION

PATENT NO. : 7,003,778 B2
APPLICATION NO. : 09/999841
DATED : February 21, 2006
INVENTOR(S) : Stepan Sokolov Page 1 of 1

It is certified that error appears in the above-identified patent and that said Letters Patent is hereby corrected as shown below:

In the Claims:

In line 2 of claim 2 (column 6, line 28) insert --plurality of-- after the second instance of "said".

In line 19 of claim 11 (column 8, line 3) insert --said-- after "execute".

Signed and Sealed this

Twenty-ninth Day of August, 2006

JON W. DUDAS
*Director of the United States Patent and Trademark Office*